(12) United States Patent
Don et al.

(10) Patent No.: US 8,584,128 B1
(45) Date of Patent: Nov. 12, 2013

(54) TECHNIQUES FOR ADJUSTING PRIORITIES ASSOCIATED WITH SERVICING REQUESTS

(75) Inventors: Arieh Don, Newtown, MA (US); James L. Davidson, Tyngsboro, MA (US); Alexander Veprinsky, Brookline, MA (US); Yechiel Yochai, Lincoln, RI (US); Patrick Brian Riordan, Watertown, MA (US)

(73) Assignee: EMC Corporation, Hopkinton, MA (US)

( * ) Notice: Subject to any disclaimer, the term of this patent is extended or adjusted under 35 U.S.C. 154(b) by 1542 days.

(21) Appl. No.: 11/900,062

(22) Filed: Sep. 10, 2007

(51) Int. Cl.
*G06F 9/46* (2006.01)

(52) U.S. Cl.
USPC ............ 718/103; 718/100; 718/102; 718/104

(58) Field of Classification Search
USPC .................................. 718/102, 103, 104, 100
See application file for complete search history.

(56) References Cited

U.S. PATENT DOCUMENTS

| | | | |
|---|---|---|---|
| 5,206,939 A | | 4/1993 | Yanai et al. |
| 5,778,394 A | | 7/1998 | Galtzur et al. |
| 5,787,482 A | * | 7/1998 | Chen et al. ..................... 711/158 |
| 5,845,147 A | | 12/1998 | Vishlitzky et al. |
| 5,857,208 A | | 1/1999 | Ofek |
| 7,564,852 B2 | * | 7/2009 | Das et al. ................. 370/395.41 |
| 7,752,623 B1 | * | 7/2010 | Crawford, Jr. ................ 718/104 |
| 7,768,920 B2 | * | 8/2010 | Goshen et al. ................ 370/235 |
| 8,301,812 B1 | * | 10/2012 | Riordan et al. .................. 710/74 |
| 2002/0191692 A1 | * | 12/2002 | Fallon et al. .................. 375/240 |
| 2004/0225736 A1 | * | 11/2004 | Raphael ........................ 709/226 |
| 2006/0047902 A1 | * | 3/2006 | Passerini ....................... 711/114 |

OTHER PUBLICATIONS

U.S. Appl. No. 11/540,017, filed Sep. 29, 2006, Yochai, et al.

* cited by examiner

*Primary Examiner* — Emerson Puente
*Assistant Examiner* — Willy W Huaracha
(74) *Attorney, Agent, or Firm* — Muirhead and Saturnelli, LLC

(57) ABSTRACT

Described are techniques for servicing data requests in a data storage system. One or more data requests from an application executing on the host are received. The data storage system allocates a first amount of resources for use in servicing data requests from the application. Behavior of the host is monitored for occurrences of I/O failure. In accordance with criteria and the occurrences of I/O failure, it is determined whether at least one of the host or the application is in a state of pending failure. If it is determined that at least one of the host or the application is in a state of pending failure, a second amount of resources larger than the first amount are allocated for a time period when servicing data requests from the application. After the time period, data requests from the application are serviced in accordance with the first amount of resources.

18 Claims, 15 Drawing Sheets

| Priority | 1 | 2 | 3 | 4 |
|---|---|---|---|---|
| QOS level (I/Os/sec; rate to process each I/O) | 200 I/Os/sec or 5 ms./I/O | 100 I/Os/sec or 10 ms./I/O | 50 I/Os/sec or 20 ms./I/O | 10 I/Os/sec or 100 ms./I/O |
| Adjusted QOS level | | | | 200 I/Os/sec or 5 ms./I/O |

FIG. 6

| LV# | Priority | QOS level |
|---|---|---|
| 1 | 4 | 100 ms. |
| 2 | 1 | 5 ms. |
| 3 | 4 | 100 ms. |
| 4 | 2 | 10 ms. |
| 5 | 1 | 5 ms. |

FIG. 8

| LV# | Abort Information |
|---|---|
| 1 | Abort 1   Time 1<br>Abort 2   Time 2 |
| 2 | |
| ..  .. | |

FIG. 9

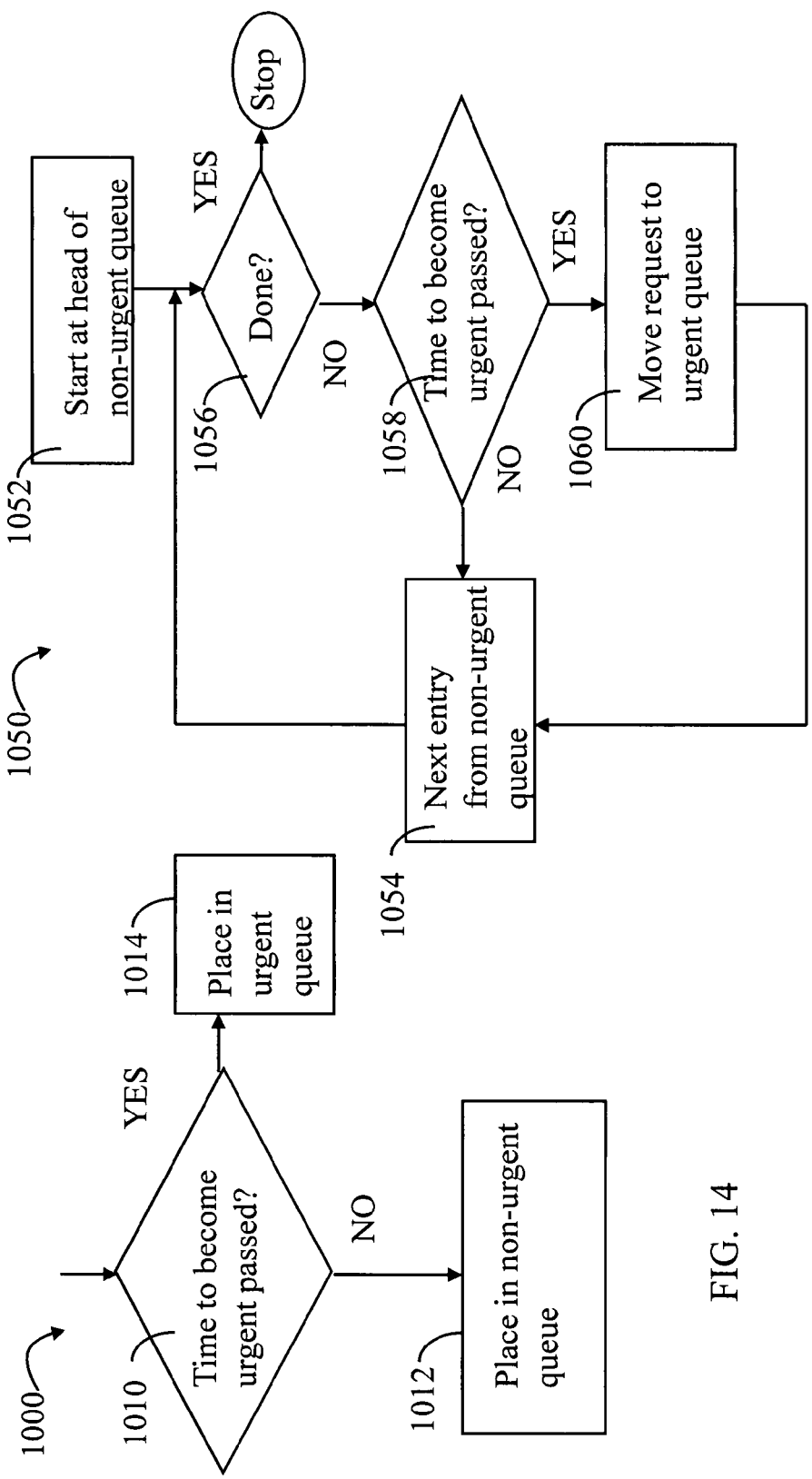

250
TECHNIQUES FOR ADJUSTING PRIORITIES ASSOCIATED WITH SERVICING REQUESTS

BACKGROUND

1. Technical Field

This application generally relates to servicing requests, and more particularly to techniques used in connection with prioritizing requests.

2. Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage device containing a plurality of host interface units, disk drives, and disk interface units. Such storage devices are provided, for example, by EMC Corporation of Hopkinton, Mass. and disclosed in U.S. Pat. No. 5,206,939 to Yanai et al., U.S. Pat. No. 5,778,394 to Galtzur et al., U.S. Pat. No. 5,845,147 to Vishlitzky et al., and U.S. Pat. No. 5,857,208 to Ofek. The host systems access the storage device through a plurality of channels provided therewith. Host systems provide data and access control information through the channels to the storage device and storage device provides data to the host systems also through the channels. The host systems do not address the disk drives of the storage device directly, but rather, access what appears to the host systems as a plurality of logical disk units. The logical disk units may or may not correspond to the actual disk drives. Allowing multiple host systems to access the single storage device unit allows the host systems to share data stored therein.

In a computing environment, multiple storage devices, hosts, and perhaps other computing devices service requests that may be initiated from many independent other devices. For example, a number of independent hosts and other storage devices may request I/Os from a particular storage system. The data storage system may store the data from multiple applications executing on multiple hosts. The resource may service requests in accordance with an appropriate priority level or quality of service (QOS) selected for each of the different requesters. For example, the data storage system may service I/O requests from the different applications using different QOS levels. A QOS level may be associated with servicing an application's I/O requests in accordance with the particular priority objectives of the application.

One problem that may occur in connection with servicing requests is that the lower priority requests may not always be serviced within a reasonable or acceptable amount of time adversely affecting the requester. For example, an I/O request not serviced within a defined time period may cause the host and/or application to experience a timeout. The host may wait a defined amount of time for the I/O request to be serviced. If the I/O request is not serviced within the defined amount of time, the host may assume that the data storage system is unable to service the I/O request resulting in the timeout. Repeated occurrences of such timeouts may cause the requester, such as the application, to be unable to meet its performance objectives and may also have other adverse affects on the requester. For example, repeated I/O timeouts may cause the application and/or host to crash (e.g., taking the host and/or application offline and cease performing its operations.)

SUMMARY OF THE INVENTION

In accordance with one aspect of the invention is a method for servicing data requests in a data storage system comprising: receiving, from a host, one or more data requests from an application executing on the host, said data storage system allocating a first amount of resources for use in servicing data requests from the application; monitoring behavior of the host for occurrences of I/O failure; determining, in accordance with criteria and the occurrences of I/O failure, whether at least one of the host or the application is in a state of pending failure; if said determining determines that at least one of the host or the application is in a state of pending failure, allocating for a time period a second amount of resources larger than the first amount for use in servicing data requests from the application; and after the time period, servicing data requests from the application in accordance with the first amount of resources. The method may also include sending a notification regarding said allocating the second amount of resources. The notification may include writing to a log file. The first amount of resources may be in accordance with a first quality of service level associated with applications having a first priority level. The second amount of resources may be in accordance with a second quality of service level associated with application having a higher priority than said first priority level. The method may also include: receiving, from said host by the data storage system, an abort command to abort a first set of one or more outstanding data requests for the application, said abort command indicating a host I/O failure, wherein said first set of outstanding data requests is received when the first amount of resources is allocated for use in servicing data requests from the application; aborting, by the data storage system, the first set of outstanding data requests; receiving, from the host by the data storage system, a second set of one or more data requests when the second amount of resources is allocated for use in servicing data requests from the application; and servicing said second set of one or more data requests in accordance with said second amount of resources. The one or more data requests from the application may be directed to a device of the data storage system, the first amount of resources being a quality of service level associated with the device. The second amount of resources may be an adjusted quality of service level associated with the device for the time period and, after the time period, the first amount of resources is reestablished as the quality of service for the device. The device may be a logical device. The criteria may include the host having a first number of I/O failures within a defined amount of time. The criteria may include limiting a number of times said allocating step is performed. The criteria may include limiting a number of times said allocating step is performed within a defined amount of time in connection with data requests from the application directed to a particular device of the data storage system. The criteria may include limiting a number of times said allocating step is performed within a defined amount of time in connection with data requests from the application and one or more other applications directed to devices of the data storage system. The method may also include collecting data regarding the occurrences of I/O failure for each device of the data storage system, wherein said determining uses said data in determining whether a threshold number of I/O failures are associated with data requests directed to at least one of the devices of the data storage system.

In accordance with another aspect of the invention is a method for servicing data requests in a data storage system comprising: receiving configuration information for the data storage system, the configuration information including a quality of service level for each device of the data storage system used by one or more applications, said quality of service for said each device indicating a maximum amount of resources of said data storage system used to service data requests directed to said each device; receiving one or more data requests from one or more applications executing on one or more hosts; monitoring behavior of the one or more hosts for abort commands to abort outstanding data requests not serviced within a defined amount of time; determining when one of the hosts has sent one or more abort commands in accordance with threshold criteria; if said determining determines that a first of said hosts has sent one or more abort commands in accordance with said threshold criteria, each of said one or more abort commands requesting to abort outstanding data requests directed to a first of the devices of the data storage system, allocating a second amount of resources for use in servicing data requests directed to the first device for a time period, said second amount being larger than a first amount in accordance with a quality of service level for the first device; and after the time period, servicing data requests directed to the first device in accordance with the first amount. The method may also include sending a notification regarding said allocating the second amount of resources. The method may also include: receiving, from one of the hosts by the data storage system, an abort command to abort a first set of one or more outstanding data requests directed to one of the devices, wherein said first set of outstanding data requests is received when a first amount of resources is allocated for use in servicing data requests directed to the one device; aborting, by the data storage system, the first set of outstanding data requests; receiving, from the one host by the data storage system, a second set of one or more data requests when a second amount of resources larger than the first amount is allocated by said allocating step for use in servicing data requests directed to the one device; and servicing said second set of one or more data requests in accordance with said second amount of resources. The threshold criteria may include receiving a threshold number of abort commands to abort data requests directed to one or more devices of the data storage system within a defined amount of time. The threshold criteria may include a maximum number of times said allocating step is performed within a defined amount of time in connection with data requests directed to one or more devices of the data storage system.

In accordance with another aspect of the invention is a data storage system comprising a computer readable medium with executable code stored thereon for servicing data requests, the computer readable medium comprising executable code for: receiving, from a host, one or more data requests from an application executing on the host, said data storage system allocating a first amount of resources for use in servicing data requests from the application; monitoring behavior of the host for occurrences of I/O failure; determining; in accordance with criteria and the occurrences of I/O failure, whether at least one of the host or the application is in a state of pending failure; if said determining determines that at least one of the host or the application is in a state of pending failure, allocating for a time period a second amount of resources larger than the first amount for use in servicing data requests from the application; and after the time period, servicing data requests from the application in accordance with the first amount of resources.

BRIEF DESCRIPTION OF THE DRAWINGS

Features and advantages of the present invention will become more apparent from the following detailed description of exemplary embodiments thereof taken in conjunction with the accompanying drawings in which:

FIG. 6 is an example illustrating priority and QOS levels as may be used in an embodiment in connection with the techniques herein;

FIG. 8 is an example illustration of a table including priority and QOS level configuration as may be included in an embodiment using the techniques herein;

FIG. 9 is an example illustration of a table including abort information tracked per LV that may be used in a embodiment with the techniques herein;

FIGS. 12, 13, 14, and 15 are flowcharts of processing steps that may be performed in an embodiment using the techniques herein.

DETAILED DESCRIPTION OF EMBODIMENT(S)

Figure 1:
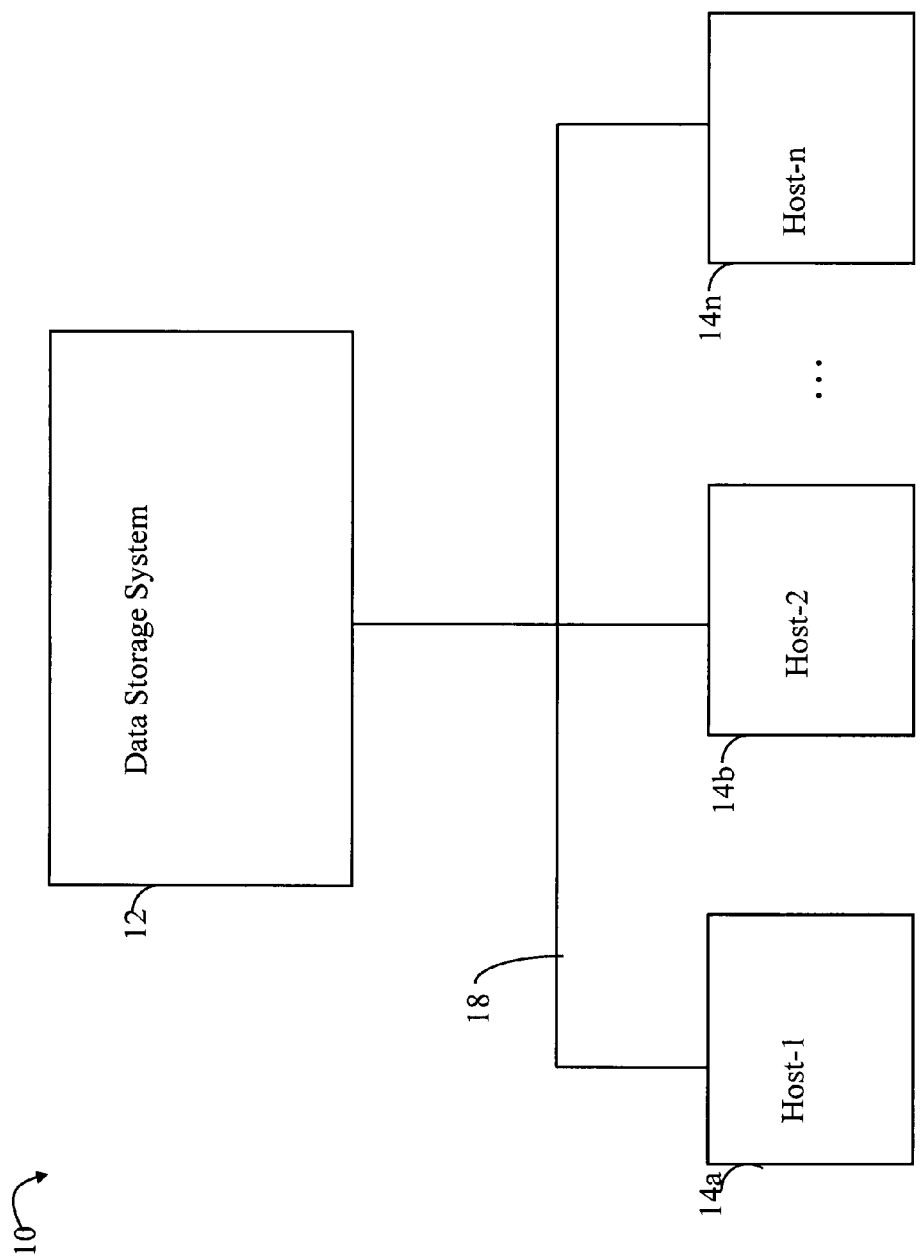
FIG. 1 is an example of an embodiment of a computer system that may utilize the techniques described herein.

Referring to FIG. 1, shown is an example of an embodiment of a computer system that may be used in connection with performing the techniques described herein. The computer system 10 includes a data storage system 12 connected to host systems 14a-14n through communication medium 18. In this embodiment of the computer system 10, and the n hosts 14a-14n may access the data storage system 12, for example, in performing input/output (I/O) operations or data requests. The communication medium 18 may be any one or more of a variety of networks or other type of communication connections as known to those skilled in the art. The communication medium 18 may be a network connection, bus, and/ or other type of data link, such as a hardwire or other connections known in the art. For example, the communication medium 18 may be the Internet, an intranet, network or other wireless or other hardwired connection(s) by which the host systems 14a-14n may access and communicate with the data storage system 12, and may also communicate with others included in the computer system 10.

Each of the host systems 14a-14n and the data storage system 12 included in the computer system 10 may be connected to the communication medium 18 by any one of a variety of connections as may be provided and supported in accordance with the type of communication medium 18. The processors included in the host computer systems 14a-14n may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage system 12 are described herein in more detail, and may vary with each particular embodiment. Each of the host computers 14a-14n and data storage system may all be located at the same physical site, or, alternatively, may also be located in different physical locations. Examples of the communication medium that may be used to provide the different types of connections between the host computer systems and the data storage system of the computer system 10 may use a variety of different communication protocols such as SCSI, Fibre Channel, iSCSI, and the like. Some or all of the connections by which the hosts, management component(s), and data storage system may be connected to the communication medium may pass through other communication devices, such as a Connectrix or other switching equipment that may exist such as a phone line, a repeater, a multiplexer or even a satellite.

Each of the host computer systems may perform different types of data operations in accordance with different types of tasks. In the embodiment of FIG. 1, any one of the host computers 14a-14n may issue a data request to the data storage system 12 to perform a data operation. For example, an application executing on one of the host computers 14a-14n may perform a read or write operation resulting in one or more data requests to the data storage system 12.

Figure 2A:
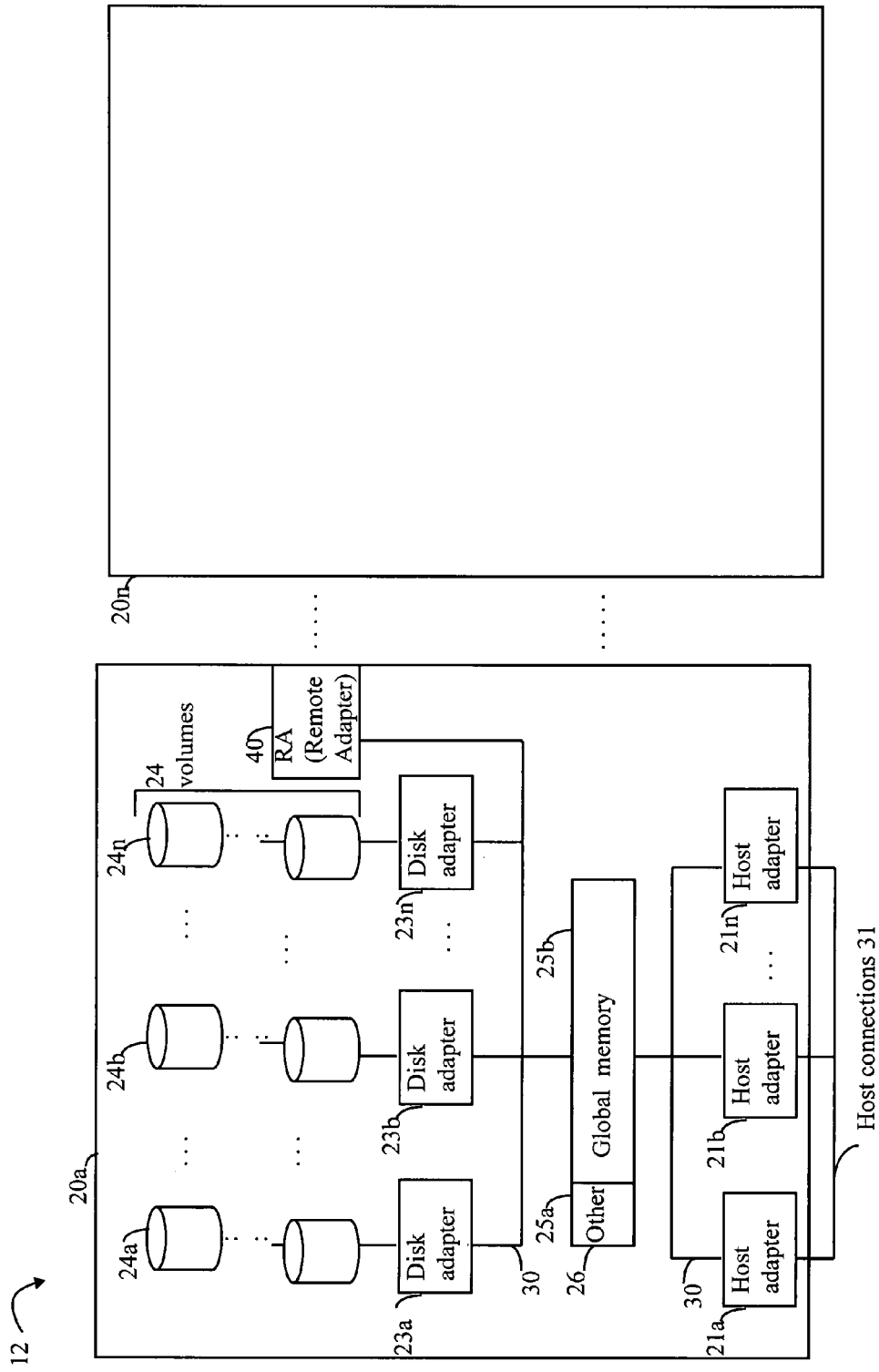
FIG. 2A is an example of an embodiment of a data storage system.

Referring to FIG. 2A, shown is an example of an embodiment of the data storage system 12 that may be included in the computer system 10 of FIG. 1. Included in the data storage system 12 of FIG. 2A are one or more data storage systems 20a-20n as may be manufactured by one or more different vendors. Each of the data storage systems 20a-20n may be inter-connected (not shown). Additionally, the data storage systems may also be connected to the host systems through any one or more communication connections 31 that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage system 12. In this example as described in more detail in following paragraphs, reference is made to the more detailed view of element 20a. It should be noted that a similar more detailed description may also apply to any one or more of the other elements, such as 20n, but have been omitted for simplicity of explanation. It should also be noted that an embodiment may include data storage systems from one or more vendors. Each of 20a-20n may be resources included in an embodiment of the computer system 10 of FIG. 1 to provide storage services to, for example, host computer systems. It should be noted that the data storage system 12 may operate stand-alone, or may also included as part of a storage area network (SAN) that includes, for example, other components.

Each of the data storage systems, such as 20a, may include a plurality of disk devices or volumes, such as the arrangement 24 consisting of n rows of disks or volumes 24a-24n. In this arrangement, each row of disks or volumes may be connected to a disk adapter ("DA") or director responsible for the backend management of operations to and from a portion of the disks or volumes 24. In the system 20a, a single DA, such as 23a, may be responsible for the management of a row of disks or volumes, such as row 24a.

The system 20a may also include one or more host adapters ("HAs") or directors 21a-21n. Each of these HAs may be used to manage communications and data operations between one or more host systems and the global memory. In an embodiment, the HA may be a Fibre Channel Adapter or other adapter which facilitates host communication.

One or more internal logical communication paths may exist between the DA's, the remote adapters (RA's), the HA's, and the memory 26. An embodiment, for example, may use one or more internal busses and/or communication modules. For example, the global memory portion 25b may be used to facilitate data transfers and other communications between the DA's, HA's and RA's in a data storage system. In one embodiment, the DAs 23a-23n may perform data operations using a cache that may be included in the global memory 25b, for example, in communications with other disk adapters or directors, and other components of the system 20a. The other portion 25a is that portion of memory that may be used in connection with other designations that may vary in accordance with each embodiment.

The particular data storage system as described in this embodiment, or a particular device thereof, such as a disk, should not be construed as a limitation. Other types of commercially available data storage systems, as well as processors and hardware controlling access to these particular devices, may also be included in an embodiment.

Also shown in the storage system 20a is an RA 40. The RA may be hardware including a processor used to facilitate communication between data storage systems, such as between two of the same or different types of data storage systems.

Host systems provide data and access control information through channels to the storage systems, and the storage systems may also provide data to the host systems also through the channels. The host systems do not address the disk drives of the storage systems directly, but rather access to data may be provided to one or more host systems from what the host systems view as a plurality of logical devices or logical volumes (LVs). The LVs may or may not correspond to the actual disk drives. For example, one or more LVs may reside on a single physical disk drive, or multiple drives. Data in a single storage system may be accessed by multiple hosts allowing the hosts to share the data residing therein. The HAs may be used in connection with communications between a data storage system and a host system. The RAs may be used in facilitating communications between two data storage systems. The DAs may be used in connection with facilitating communications to the associated disk drive(s) and LV(s) residing thereon.

The DA performs I/O operations on a disk drive. In the following description, data residing on a LV may be accessed by the DA following a data request in connection with I/O operations that other directors originate.

Figure 2B:
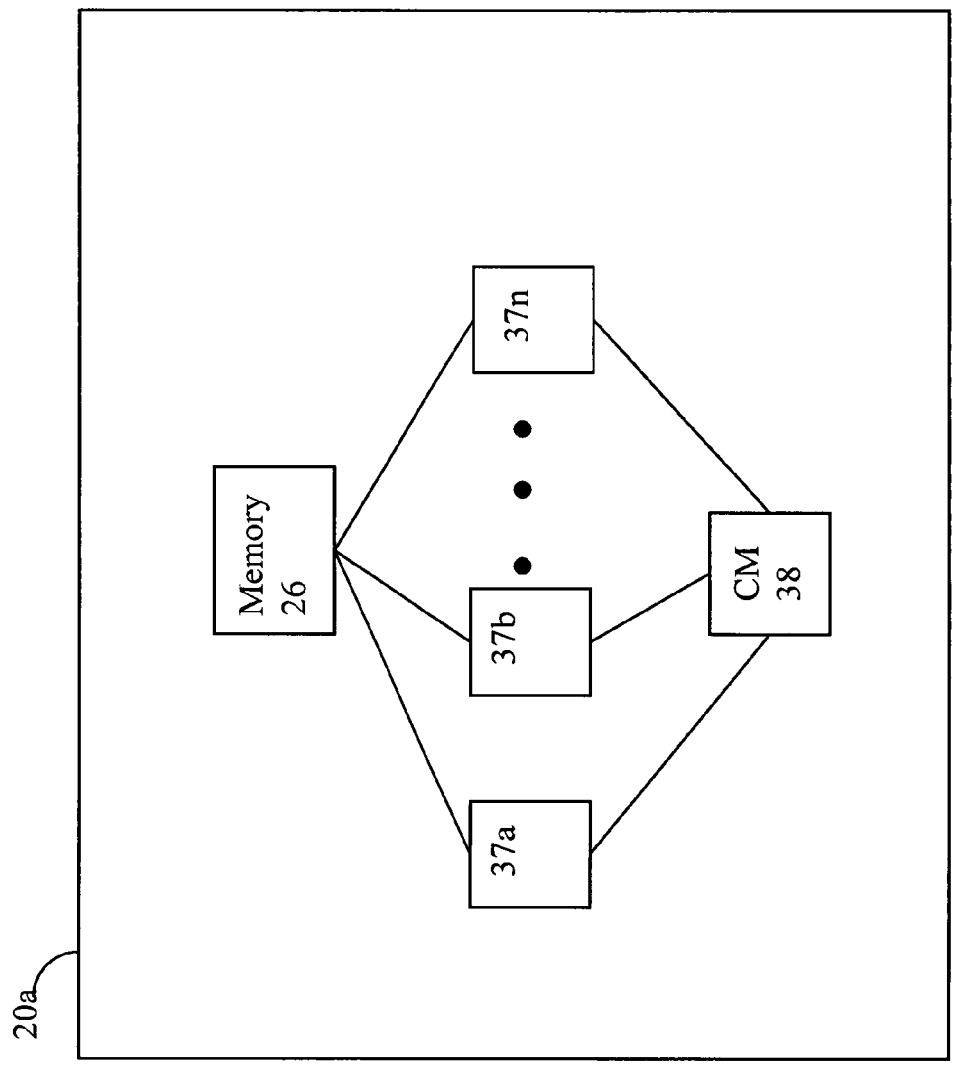
FIG. 2B is a representation of the logical internal communications between the directors and memory included in one embodiment of data storage system of FIG. 2A.

Referring to FIG. 2B, shown is a representation of the logical internal communications between the directors and memory included in a data storage system. Included in FIG. 2B is a plurality of directors 37a-37n coupled to the memory 26. Each of the directors 37a-37n represents one of the HA's, RA's, or DA's that may be included in a data storage system. In an embodiment disclosed herein, there may be up to sixteen directors coupled to the memory 26. Other embodiments may use a higher or lower maximum number of directors that may vary.

The representation of FIG. 2B also includes an optional communication module (CM) 38 that provides an alternative communication path between the directors 37a-37n. Each of the directors 37a-37n may be coupled to the CM 38 so that any one of the directors 37a-37n may send a message and/or data to any other one of the directors 37a-37n without needing to go through the memory 26. The CM 38 may be implemented using conventional MUX/router technology where a sending one of the directors 37a-37n provides an appropriate address to cause a message and/or data to be received by an intended receiving one of the directors 37a-37n. In addition, a sending one of the directors 37a-37n may be able to broadcast a message to all of the other directors 37a-37n at the same time.

Figure 3:
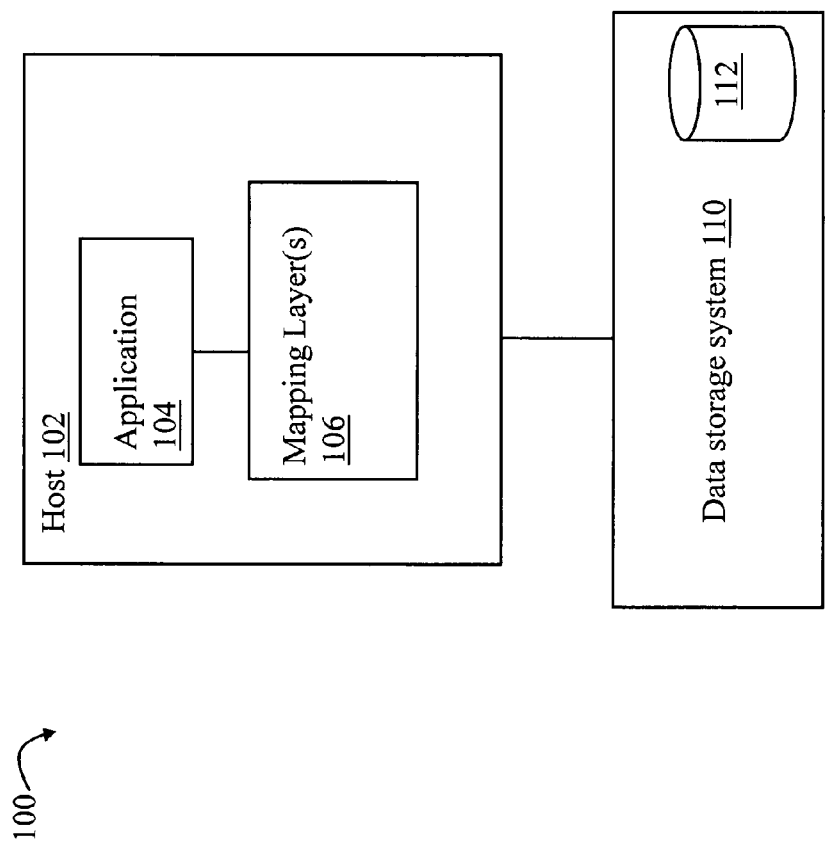
FIG. 3 is an example of an embodiment of a host and data storage system that may utilize the techniques described herein.

Referring to FIG. 3, shown is an example representation of a host and data storage system that may be used in connection with the techniques herein. The host 102 may include one or more applications 104 and one or more mapping layers 106. As described in following paragraphs, the mapping layers 106 may be used to facilitate data storage requests for data included in data storage system 110 by the application 104. Each of the hosts of FIG. 1 may be configured in accordance with the example host 102 of FIG. 3.

Data stored on storage devices of the data storage system 110 may be organized into units referred to as blocks of the physical device 112. Each block has an associated size, such as 512 bytes. Data requests and operations on the host-side may use logical data objects including groups of related blocks which may or may not be contiguous. Logical data objects on the host may be used by one or more applications 104 as well as the one or more mapping layers 106.

Files are examples of logical data objects on the host-side which refer to collections of data storage blocks. For example, an application 104 may perform I/O operations on a file. File systems and logical volumes (LVs) are other examples of logical data objects on the host-side which refer to collections of data storage blocks on physical devices of the data storage system. For example, a system manager may perform operations related to a file system including one or more files. Different logical data objects may be used by the application as well as one or more of the mapping layers 106. For example, the mapping layers 106 may include a Logical Volume Manager (LVM) which uses LVs. The mapping layers 106 may be used to map storage locations associated with a first higher level logical data object, such as the file, to corresponding storage locations expressed using other logical data objects, such as LVs, as may be used by the different mapping layers 106.

Figure 4:
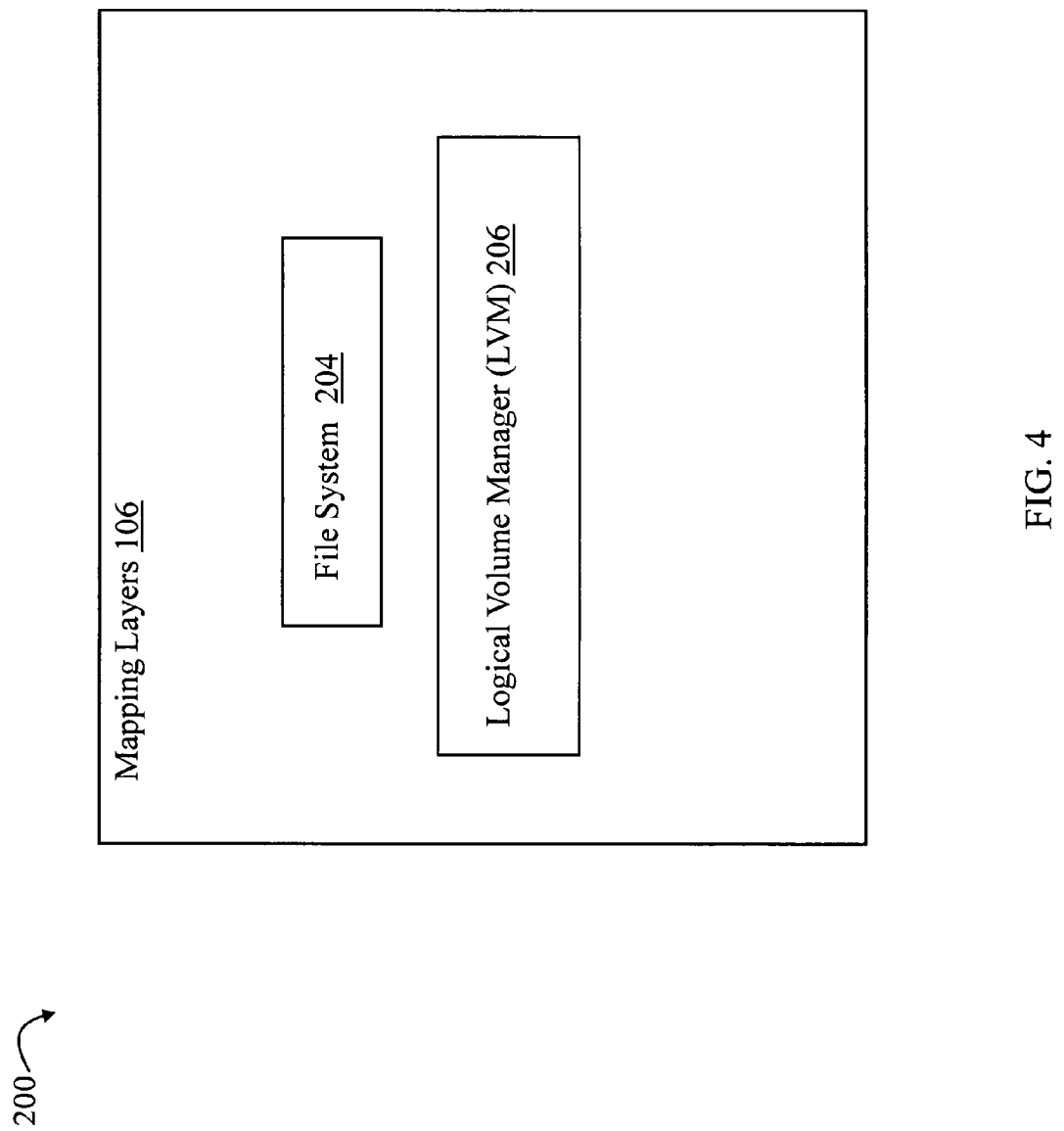
FIG. 4 is an example of the different mapping layers that may be included in an embodiment.

Referring to FIG. 4, shown is an example illustrating the different mapping layers that may be included in an embodiment. The mapping layers 106 in the example 200 include a file system 204 and LVM 206. Although 2 layers are illustrated, it should be noted that an embodiment may include any number of layers for use with the techniques herein. The layers form a stack with the highest layer or level in this example being the file system 204, and the lowest mapping layer or level being the LVM layer 206. Each layer performs a mapping of a data storage location having a first logical representation to a second logical representation at the next lowest level. Each layer may use different logical data objects to express a data storage location. Furthermore, as described above, an embodiment may have one or more different logical data objects used by the different mapping layers. For example, an application may perform a request to read or write data to a location in a file. The location as used by the application and file system 204 may be expressed as a first representation of a file and offset (e.g., block offset) within the file. The file system 204 maps the first representation to a second representation understood by the LVM 206. More specifically, the file and offset within the file are mapped to an LV and offset as understood by the LVM 206. The representation at each layer may be characterized as a logical representation of a data storage location as used by the host. The logical representation of a data storage location of the bottom-most or lowest layer (e.g., 206 in this example) may then be mapped to a physical location on the data storage system 110, such as a location on the physical device 112 of FIG. 3.

As illustrated in FIG. 1, customers may consolidate data storage for multiple applications running on multiple hosts to a single data storage system so that multiple applications now have their data hosted on the single data storage system, such as data storage system 12. The consolidation results in the data storage system 12 servicing I/O requests from the multiple applications. The data storage system may be configured to service I/O requests from the different applications in accordance with defined QOS levels or priorities. A QOS level or priority level may be associated with servicing I/O requests for each application in accordance with the objectives of each application. Each QOS level may affect the amount of data storage system resources allocated for servicing a request, such as the I/O request. When servicing I/O requests from the different applications, the QOS level associated with each application is used to partition the data storage system's available resources. The QOS level may affect the rate at which I/O requests are processed for the different applications.

One problem that may occur in connection with servicing requests is that the lower priority requests may not always be serviced within a reasonable or acceptable amount of time adversely affecting the requester. For example, an I/O request not serviced within a defined time period may cause the host and/or application to experience a timeout. The host upon which the application issuing the I/O request is executing may wait a defined amount of time for the I/O request to be serviced. If the I/O request is not serviced within the defined amount of time, the host may assume that the data storage system is unable to service the I/O request resulting in the timeout. Repeated occurrences of such timeouts may cause the requester, such as the application, to be unable to meet its performance objectives and may also have other adverse affects on the requester. For example, repeated I/O timeouts may cause the application and/or host to crash (e.g., taking the host and/or application offline and cease performing its operations). In other words, repeated I/O timeouts or other repeated failures to perform a request may cause the requester to experience a more comprehensive failure affecting the requester's ability to perform its operations.

In connection with a data storage system, the foregoing repeated I/O timeouts may occur for any one or more different reasons. For example, the application priorities or QOS levels may be incorrectly assigned and may need to be adjusted. In situations in which the QOS levels may be incorrectly assigned, the techniques herein provide for temporary adjustment or increasing the QOS level of the failing application along with a notification regarding the adjustment to an administrator. Thus, the application and host are provided with a safety mechanism to temporarily be given additional resources to prevent the application and/or host from crashing while providing notification to the administrator so the administrator has the opportunity to take a corrective action if desired.

Another cause of repeated I/O timeouts may be that I/O requests from a particular application occasionally arrive at the data storage system in bursts or groups. The foregoing burst activity may cause a temporary backlog of I/O requests for the issuing host and/or application in accordance with currently assigned QOS levels. However, absent such burst activity, the data storage system may otherwise process I/O requests without causing the host and/or application to repeatedly experience I/O timeouts. In situations such as this with the burst activity of requests, the techniques herein may be used to temporarily allocate additional resources to service the backlog of requests and alleviate further repeated I/O timeouts, additional failures, and other adverse results, such as the host and/or application crashing.

Described in following paragraphs are techniques that may be used for servicing requests in accordance with defined QOS levels assigned to requesters while also monitoring requester behavior, such as monitoring for repeated I/O timeouts which can cause host and/or application failure. In connection with monitoring and detecting such activity, the data storage system may temporarily adjust the QOS level associated with the application to allocate more resources for use in servicing I/O requests from the application. The additional resources may be allocated for a defined time period in order to alleviate any temporary backlog of I/O requests, such as may be associated with a burst of I/O activity, in order to avoid additional failures and adverse results such as the host and/or application crashing. Additionally, notification may be provided regarding the temporary increase in QOS level so that a manual and/or automated response may be performed. For example, an administrator or other individual may take a corrective action such as modify existing QOS levels assigned in the data storage system, reducing the rate at which I/O requests are sent from the host, and the like.

The techniques described herein may be used to monitor instances of I/O timeouts experienced by the application and host. In such instances where repeated I/O timeouts have been detected, additional resources of the data storage system may be allocated temporarily to service the I/O requests of the application and host experiencing the repeated I/O timeouts. Such additional allocation may be made by temporarily adjusting the priority or QOS level for the application. The techniques herein provide an adaptive control to temporarily allocate additional resources to prevent continued I/O timeouts.

Described herein are techniques that may be used in connection with an embodiment in which an application executing on a host issues an I/O request to be serviced by the data storage system. However, it will be appreciated by those skilled in the art that the techniques herein have general applicability for use in connection with other types of requests, requesters, and resources.

Figure 5:
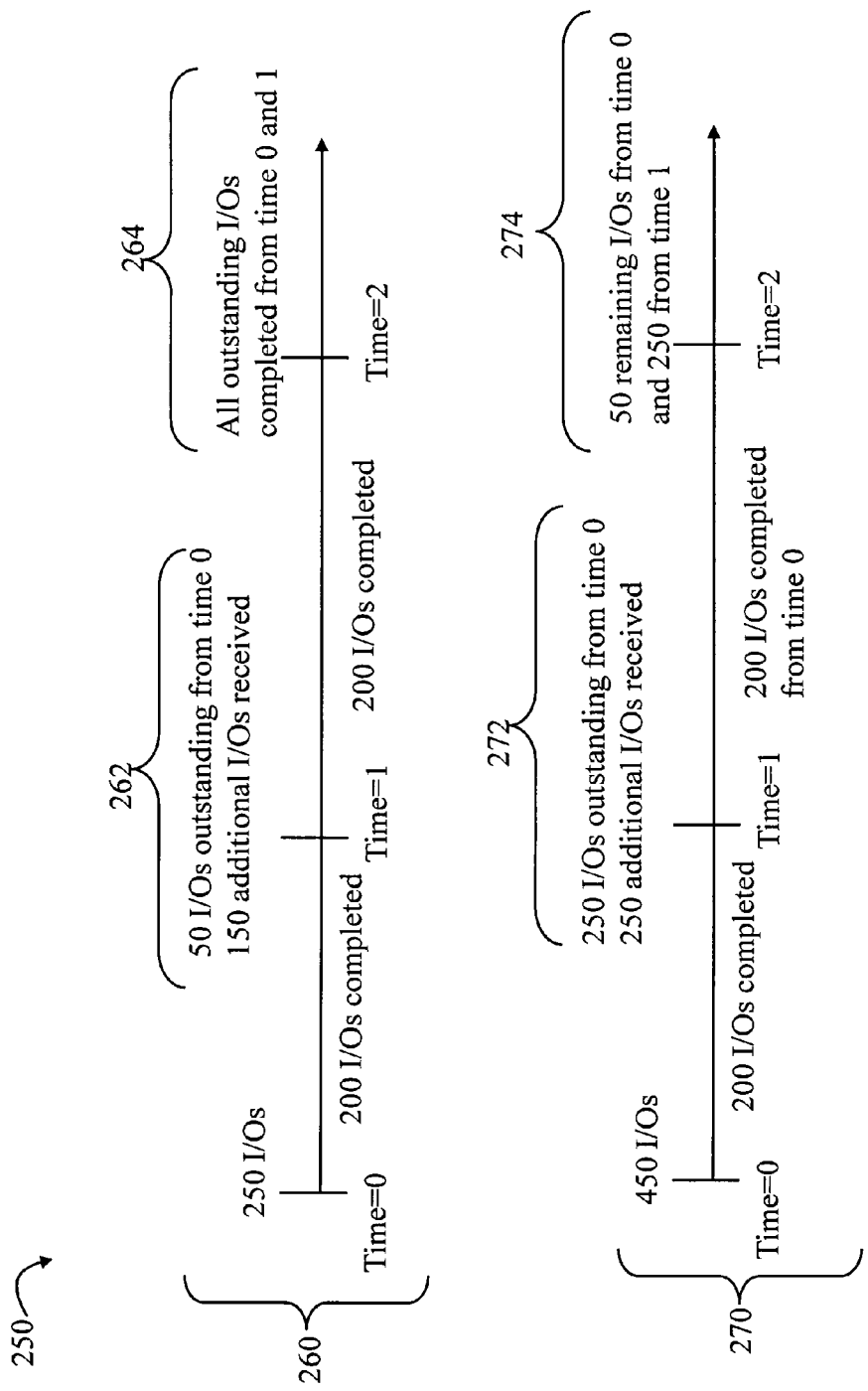
FIG. 5 includes examples illustrating use of QOS levels.

Referring to FIG. 5, shown is an example illustrating when the techniques herein may be utilized. In 260 and 270, a time line and activities occurring at different points in time are illustrated in connection with I/O requests issued from an application on a host to a data storage system. For purposes of illustration, the data storage system may be configured to process 200 I/Os per second for the application, all I/Os from the application may be directed to a single device, such as a single LV, the units of time as represented in 260 and 270 may be seconds, and the host may have an I/O timeout period of 2 seconds. If an I/O does not complete within 2 seconds from issuance by the host, the host has an I/O timeout indicating an I/O failure. In response to the I/O timeout, the host may issue a command to the data storage system to abort the application's outstanding I/Os. In one embodiment, the request may be to abort those outstanding I/Os associated with the one or more devices, such as LVs, which are used by the application and also associated with the I/O requests causing the I/O timeout. The abort request may be for those outstanding I/Os causing the I/O timeout along with any additional outstanding I/O requests directed to the one or more devices. The host may issue new I/O requests for those aborted I/Os. Repeated I/O timeouts may cause further adverse results such as host and/or application failure (e.g., causing the host and/or application to crash and cease performing operations). The particular conditions causing such host and/or application failure may vary with the host and/or application tolerance levels such as receiving a number of I/O timeouts within a particular period of time (e.g., 3 I/O timeouts occurring within 30 seconds).

The example illustrated in 260 indicates a first set of exemplary conditions under which there are no I/O timeouts and all I/O requests from the application complete within the 2 second I/O timeout period. The example illustrated in 270 indicates a second set of exemplary conditions under which an I/O timeout will occur.

With reference to the example 260, at time=0, an application on a host may issue 250 I/O requests to the data storage system. At time=1, 200 of the I/Os received from time=0 are completed and additional 150 new I/O requests are received. Thus, at time=1 as illustrated by element 262, 50 I/Os remain outstanding (from time=0) along with the additional 150 I/O requests received at time=1. During the 1 second time interval from time=1 to time=2, another 200 I/O requests are completed. The 200 I/O requests completed from time=1 to time=2 are those represented by 262. At time=2 as indicated by 264, there are no outstanding I/O requests from the application and the data storage system is able to process all host I/Os within the host I/O timeout period.

At some point, there may be I/Os from the host which are queued and outstanding for more than the host I/O timeout period of 2 seconds. With reference to the example 270, at time t=0, the application executing on the host may send 450 I/O requests to the data storage system. At time=1, 200 of the I/Os received from time=0 are completed and additional 250 new I/O requests are received. Thus, at time=1 as illustrated by element 272, 250 I/Os remain outstanding (from time=0) along with the additional 250 I/O requests received at time=1. During the 1 second time interval from time=1 to time=2, another 200 I/O requests are completed. The 200 I/O requests completed from time=1 to time=2 may be 200 of those from time=0. Thus, at time=2 as represented by 274, there are 50 outstanding I/O requests from time=0 and 250 outstanding I/O requests from time=1. In this example 270, the 50 outstanding I/O requests originally issued at time=0 cause a host I/O timeout to occur at time=2. The host determines that there are outstanding I/Os not completed within the host I/O timeout limit. The host may then send an abort command to the data storage system telling the data storage system to abort all outstanding host I/Os for particular devices used by the application. With reference to the example 270, the host abort command may cause all the outstanding application I/Os for the LV to be aborted. Thus, the aborted I/O requests may be those 300 outstanding I/O requests represented by 274.

The foregoing illustration of 270 in which outstanding I/Os do not complete within the host I/O timeout may occur at various points, for example, in connection with bursts of I/O requests. Repeated I/O timeouts may be a problem for the host and/or application if it occurs repeatedly for a consecutive number of times within a defined time period. As described above, the host may have a tolerance to withstand a consecutive and/or repeated number of host I/O failures or I/O failures. After such a threshold is reached, the host and/or application may fail (e.g., host/application may crash and go offline/unavailable for use).

It should be noted that the abort command issued from the host in connection with aborting outstanding application I/O requests may not affect other I/O from other applications on the same and/or different host.

In connection with a data storage system servicing the I/O requests of FIG. 5 illustrations, each device, such as an LV, may have an associated priority level with associated QOS levels or limits. The one or more LVs used by the application may be configured to have an associated priority and QOS level in accordance with the application objectives. An application may use one or more LVs. Each of the LVs used by the application may be configured to have the same or different priority level. In connection with the abort request issued from the host having an application executing thereon to abort outstanding I/O requests for the application, the abort request may abort all currently outstanding I/O requests for one, or more LVs of the application. If the host determines that the I/O requests causing the timeout are on a single LV used by the application, the abort request may be for those currently outstanding I/O requests on the single LV. The host may then issue new I/O requests for those aborted. It should be noted that one or more LVs may be used two or more applications. In this instance, the request to abort all outstanding I/O requests issued from a first of the applications may cause outstanding I/O requests from the second of the applications using the same LVs as the first application to also be aborted.

Although priority and QOS levels may be associated with each LV as described herein, it should be noted that an embodiment may provide for priority and QOS configuration of a data storage system using other data storage units that may be used by an application.

In accordance with techniques herein, the data storage system may keep track of the host and/or application activity with respect to the data storage requests, such as the number of commands to abort what I/O requests, which occur within a certain window of time. If selected conditions occur, the techniques herein may be utilized so that the data storage system performs processing to take appropriate preventive actions. The techniques herein may be used to detect conditions which may cause the host and/or application to fail. The techniques herein may be used to monitor host I/O timeouts by monitoring the number of abort commands received. The data storage system may take action if certain conditions are detected in efforts to avoid host and/or application failure due to excessive I/O timeouts. As described in more detail in following paragraphs, the actions taken may include raising the priority and QOS level of the one or more LVs for which the abort request was issued and sending a notification regarding the adjusted priority and QOS level.

Referring to FIG. 6, shown is an example illustrating the different priority and QOS levels that may be defined for use in a data storage system. The example 300 includes 4 different priority levels as indicated in 310. Each of the priority levels in 310 has a corresponding mapped QOS level in row 312. In this example, a user may specify a priority level when configuring the data storage system. The priority level may be mapped to a corresponding QOS level indicating an upper bound or limit on the resources for the associated priority level. The QOS levels of row 312 indicate a maximum number or rate of I/O requests processed per second (e.g., 200 I/Os per second for priority 1) and an equivalent value of how long it takes on average to process a single I/O (e.g. 5 ms per I/O request) given the specified processing rate. The example 300 indicates that priority 1 LVs have a processing rate of 200 I/Os per second or 5 milliseconds per I/O, priority 2 LVs have a processing rate of 100 I/Os per second or 1 milliseconds per I/O, per second, priority 3 LVs have a processing rate of 50 I/Os per second or 20 milliseconds per I/O, and priority 4 LVs have a processing rate of 10 I/Os per second or 100 milliseconds per I/O.

An LV on the data storage system may be configured to have an associated priority and QOS level selected from one of those illustrated in the example 300 in accordance with the particular performance and objectives of the application. The selected priority may be in accordance with the expected application performance I/O rate. The QOS level may be characterized as an upper bound or limit on the I/O processing rate for I/O requests which are directed to an LV having the associated priority level. As an example, a data storage system may be able to process 360 I/Os per second. There may be 4 LVs each having a different one of the priorities and QOS levels of FIG. 6. Four applications may each direct I/Os to a different one of the 4 LVs. The actual resource usage of the data storage system with respect to I/Os for each LV may be at or below the specified QOS levels for each LV.

The adjusted QOS level 316 used with the techniques herein will be explained with reference to FIG. 7 in following paragraphs.

Figure 7:
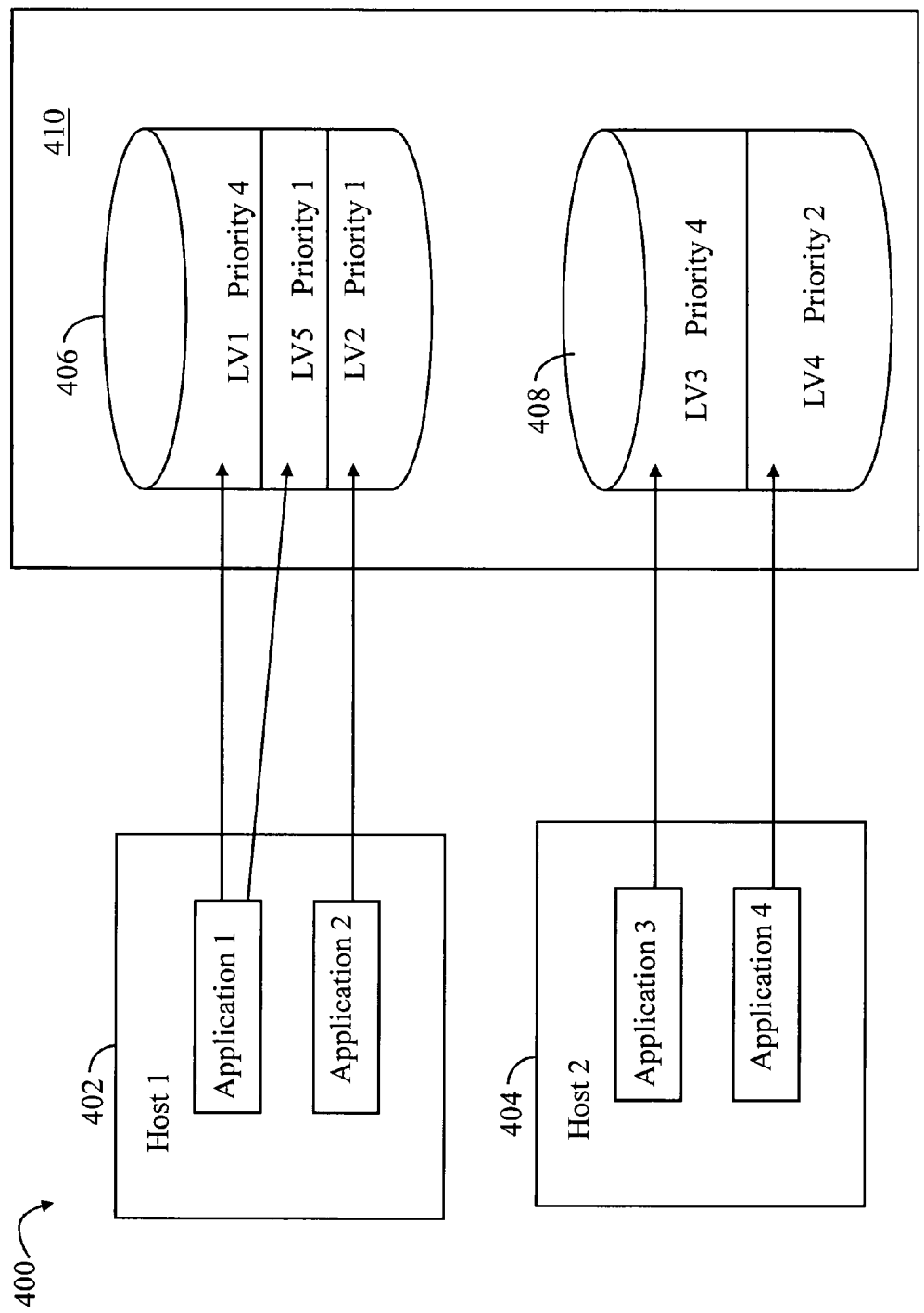
FIG. 7 is an example illustrating different priority levels associated with the logical volumes (LVs) of a data storage system that may be used in connection with the techniques herein.

Referring to FIG. 7, shown is another example illustrating priority and QOS level configuration using the priorities of FIG. 6. The example 400 includes hosts 402 and 404. Host 402 has executing thereon application 1 and application 2. Host 404 has executing thereon application 3 and application 4. Devices 406 and 408 may be included in a data storage system 410 configured using the priorities of FIG. 6 in which LV1 has priority 4, LV2 has priority 1, LV3 has priority 4, LV4 has priority 2 and LV5 has priority 1. Application 1 may use LV1 and LV5 for data storage. Application 2 may use LV2 for data storage. Application 3 may use LV3 for data storage. Application 4 may use LV 4 for data storage. Each of the LVs may have an associated priority and QOS level providing for allocation or partitioning of resources of the data storage system 410 in connection with servicing I/O requests.

It should be noted that FIGS. 6 and 7 illustrate an embodiment in which a priority level is mapped to a corresponding QOS level. An embodiment may alternatively allow configuration via directly specifying the QOS levels. Additionally, although the foregoing indicates QOS levels for a particular resource, QOS levels may be specified for one or more different resources used by a data storage or other system performing a service. For example, in an embodiment may specify QOS levels in accordance with a maximum amount of buffer space, memory that may be allocated for use, amount of write pending storage space, and/or amount of cache utilized, and the like.

With reference to FIG. 7, if an I/O timeout is experienced by one of the hosts upon which one of the four applications is executing, the host may issue an abort command. For example, I/O requests for LV1 may not be serviced within the host timeout period causing an I/O timeout for host 1. Host 1 may issue an abort command to the data storage system 410 to abort all currently outstanding I/O requests (e.g., I/O requests in progress) for LV1. Host 1 may then reissue new I/O requests for those aborted. The process of receiving an I/O timeout or failure for LV I/Os and reissuing new I/O requests for those aborted may occur multiple times. At some point, a threshold number of I/O requests may occur within a defined period of time causing host 1 and/or application 1 to fail as described herein. In efforts to detect and take actions to avoid such host and/or application failure due to repeated host I/O failures, the techniques herein may be utilized.

The techniques herein may be triggered if, for a given LV, there are X aborts received by the data storage system within a threshold time period, Y, and the LV is currently utilizing the maximum amount of resources allocated in accordance with defined QOS levels. The data storage system may monitor the behavior of the host and/or application with respect to the aborts issued for the data storage (e.g., LV(s)) used by the application. If the foregoing conditions are detected, the application and/or host may be characterized as being in a distressed state on the verge of possible failure. In other words, the distressed state may correspond to a state of pending failure for the host and/or application. Values of X and Y may be selected in accordance with known application and/or host tolerances. For example, if it is known that a host and/or application will likely fail if 3 I/O timeouts occur in 30 seconds, values of 3 and 25 may be selected, respectively, for X (e.g., number of I/O timeouts or failures) and Y (e.g., within Y seconds).

It should be noted that an embodiment may use different techniques in connection with the foregoing to determine the LV is currently utilizing the maximum amount of resources allocated in accordance with defined QOS levels. Such a determination may be made to ensure that the aborts received from the host for failed I/O requests are due to the fact that additional data storage system resources are needed. Such a determination may be made since a failed I/O request may be due to other causes such as, for example, problems with the connection between the host and data storage system over which the I/O requests are transmitted. An embodiment may check to ensure that the maximum amount of resources allocated in accordance with defined QOS levels for an LV are being utilized by monitoring current resource usage rates by the data storage system. If the monitored current resource usage for an LV is within a predetermined amount of the defined QOS level for an LV, the data storage system may determine that the maximum amount of resources allocated via the defined QOS level for the LV are being used. In another embodiment utilizing TBUs (time to become urgent values) as described elsewhere herein, a determination that a maximum amount of resources allocated in accordance with defined QOS levels for an LV are being utilized may be made by determining whether a predetermined amount (e.g., such as ½) of pending I/O requests for the LV are urgent.

The techniques herein provide for temporarily adjusting the QOS level in connection with I/O requests associated with an LV experiencing the threshold X I/O failures within Y seconds.

The QOS level may be adjusted for a time period, Z. Z may be referred to as an expiration time after which the adjusted QOS level expires and the defined or configured QOS level for the LV is again in effect. For example with reference to FIG. 7, if I/O requests directed to LV1 (e.g., used by application 1 of host 1) cause host 1 to experience the threshold condition of X aborts in Y seconds and all resources currently allocated for use with such I/O requests are at the specified QOS level (e.g., actual utilization of resources is at the maximum in accordance with the QOS level for priority 4), the data storage system may adjust the QOS level for LV1. The adjustment may be an increase in the amount of resources allocated for use with I/O requests for LV1. In one embodiment, the adjustment may be to allow LV to utilize all available resources of the data storage system for a time period Z.

In another embodiment, the adjustment may be to increase the associated QOS level for LV1 to a specified amount in accordance with a defined policy. For example, an embodiment may define a policy in which LV1 is assigned an increased QOS level in accordance with the highest priority level, level 1. This is illustrated with reference back to FIG. 6 element 316 with the adjusted QOS limit of 200 I/Os per second or 5 ms. per I/O. The highest level may be the one having the greatest relative amount of resources allocated for use of all priority and associated QOS levels. If an LV of the highest priority level is associated with the I/O requests meeting the foregoing threshold condition, I/O requests for the LV may be allowed to utilize all available resources of the data storage system for a time period, Z. These are just examples of various policies and adjustments that may be utilized in an embodiment to increase the priority and QOS level of the LV associated with the I/O requests meeting the threshold condition indicating that the application and/or host is in a distressed state.

The time period, Z, may be viewed as a time period in which the additional resources are allocated to let the outstanding I/Os identified as causing the host and/or application to be in the distressed state "drain" from (e.g., be processed by) the data storage system.

X, Y and Z may be configurable values selected in accordance with particulars of each embodiment. For example, X and Y may be selected in accordance with the host tolerances. If an embodiment may include any one of multiple hosts, the selection of X and Y may be made in accordance with the least or minimal host tolerance. Similarly, a value of Z may be selected in accordance with the load on a particular data storage system.

Additionally, if the threshold conditions of X and Y are met as described above, a notification may be sent. The notification may serve to notify an administrator or other individual regarding the temporary increase in priority and QOS level for the LV. The notification may also include information about the current priority and QOS level and the time period Z after which the defined or pre-existing priority and QOS level is restored. The notification may provide the administrator with the opportunity to take any further corrective action. The notification may take one or more different forms such as, for example, writing to a log file, and/or sending an email or other notification directly to an administrator.

An embodiment may utilize other metrics to define QOS levels. For example, an embodiment may define QOS levels by indicating a "time to become urgent" or TBU value. A TBU value may be associated with LV as with other QOS levels. An embodiment may define priority levels and map priority levels to designated TBU values in a manner similar to as described herein in connection with FIG. 6. The TBU value may specify an amount of time, such as a number of seconds, after which an outstanding I/O request becomes urgent. Otherwise, an I/O request may be non-urgent. Urgent requests may be processed with a higher priority than (e.g. may be processed prior to) non-urgent requests. A TBU value may indicate, for example, an age of a request. After an I/O request has been outstanding for a threshold amount of time as indicated by the TBU of the LV, the I/O request becomes urgent. TBUs and techniques used in connection with processing requests are described, for example, in pending U.S. patent application Ser. No. 11/540,017, filed on Sep. 29, 2006, PROVIDING SERVICE BASED ON TIME TO BECOME URGENT, which is incorporated by reference herein. In connection with TBUs, lowering the TBU raises the priority or QOS level for an LV.

Referring to FIG. 8, shown is an example of LVs and associated priority and QOS levels that may be specified. The table 500 may include TBU values as the QOS levels associated with different priorities. The table 500 includes a column of LVs 502, priority levels 504 and associated QOS levels 506. Each row of the table 500 corresponds to information configured in the data storage system for a different LV. In one embodiment, configuration information may be specified for each LV by indicating the information in 502 and 504. An embodiment may automatically map each priority level from 504 to a corresponding QOS level as indicated in 506 in accordance with a defined mapping. In this example, there may be 4 defined priority levels each having a corresponding QOS level. As illustrated, priority 1 may be characterized as having the highest priority level and the greatest relative amount of resources allocated for I/O requests of all 4 priority levels. Priority 4 may be characterized as having the least priority level of defined 4 priorities since priority 4 has the least relative amount of resources allocated for I/O requests of all 4 priority levels.

The TBU metric value is another way of expressing and defining QOS levels and maximum or upper limits on resources that may be used for servicing I/O requests directed to a particular LV. Other embodiments may use other metrics and/or other resources.

In accordance with the threshold condition at which the priority and QOS level of an LV is adjusted to allocate more resources, the QOS level may be adjusted using TBU values by making the TBU value smaller thereby decreasing the amount of time before an I/O request directed to the LV is deemed urgent.

Referring to FIG. 9, shown is a table 550 of information that may be maintained in an embodiment of a data storage system utilizing the techniques herein. The information in 550 includes a column of LVs 560 and corresponding abort information 562. A row in the table may exist for each LV and include information regarding commands received to abort outstanding I/O requests as sent by a host in connection with an I/O timeout or failure as described above. Each time the data storage system receives a request from a host to abort outstanding I/Os for a particular LV in 560, corresponding information is recorded in 562 including the time at which the abort command was issued by the host. The time may be indicated, for example, as timestamp value in the received abort command. Using the information recorded, the data storage system may determine when X aborts are received during a window of time, Y, for an LV currently utilizing all allocated resources in accordance with the LV's QOS level. An embodiment may periodically purge information from the table 550 when the abort information becomes outdated and is no longer of use in connection with the techniques herein.

Figure 10:
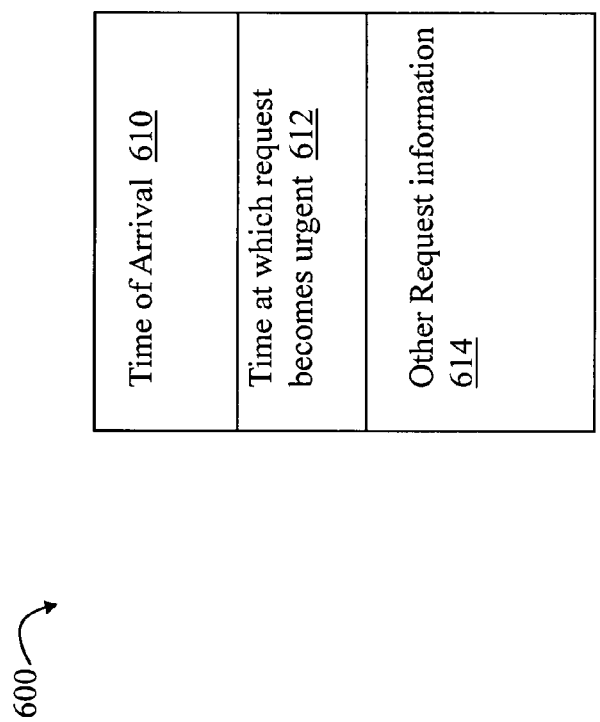
FIG. 10 is an example illustrating information that may be associated with a received I/O request in an embodiment using the techniques herein.

Additional details will now be described in connection with an embodiment utilizing TBUs. In such an embodiment, an incoming I/O request may be received from the host, such as by an HA or other director that receives host I/O requests. The received request may be tagged with a time of arrival at the data storage system and a time at which the request becomes urgent. FIG. 10 illustrates the foregoing as may be associated with a received I/O request 600. A received I/O request may have a time of arrival 610 indicating the time (e.g., timestamp) at which the request was received by the data storage system. The time at which the request becomes urgent 612 may be a time value, such as date and/or wall clock time, at which the I/O request becomes urgent. The value in 612 may be determined in accordance with the TBU value defined for the LV to which the I/O request is directed. For example, if a received I/O request is a read or write request for data from LV1, a TBU value defined as the QOS level for LV1 is determined. The time at which the I/O request becomes urgent may be determined by adding the TBU value to a value corresponding to the current date and/or time. Element 614 may represent other I/O request information.

Once the I/O request has been tagged with the time of arrival 610 and the time at which the request becomes urgent 612, the I/O request may be queued to the appropriate DA to await servicing. The DA may perform processing in connection with a received I/O request.

Figure 11:
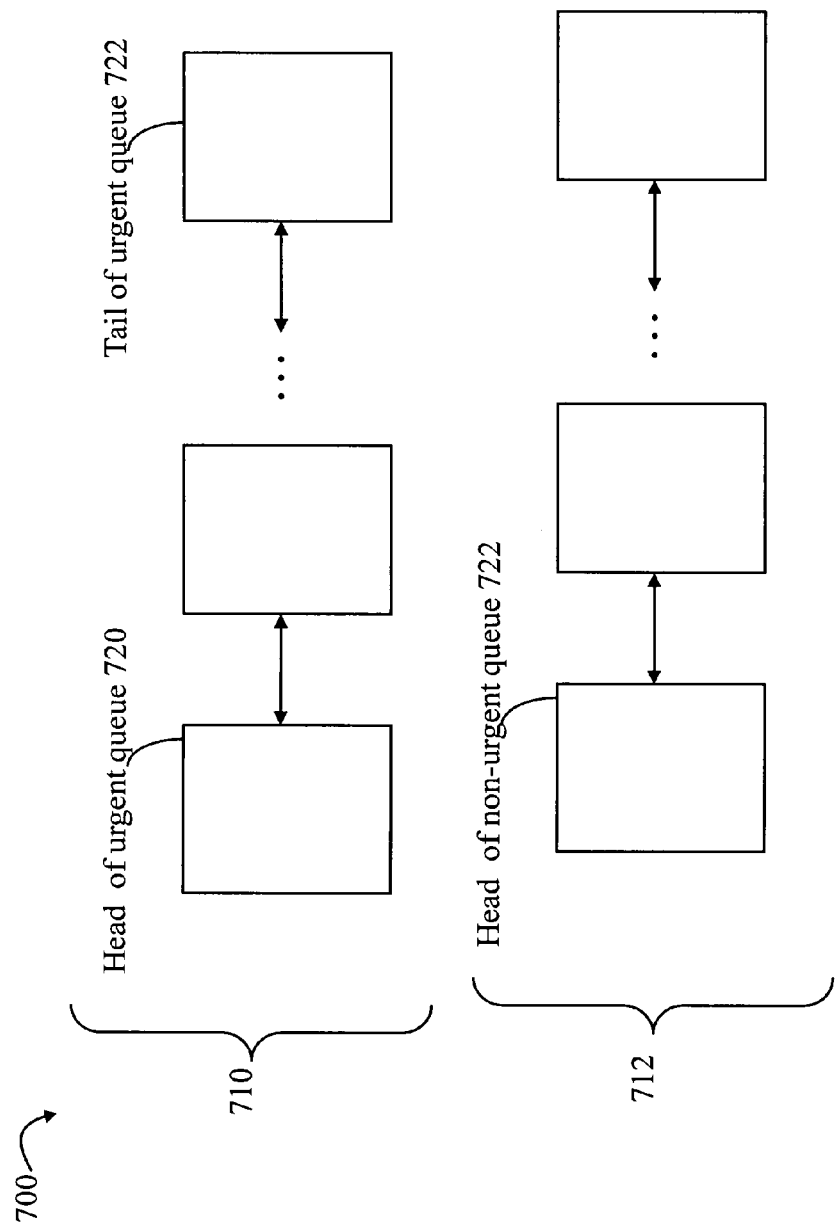
FIG. 11 is an example illustrating different queues that may be used in an embodiment with the techniques herein for I/O requests waiting to be serviced.

Referring to FIG. 11, shown is an example of the queues that may be utilized by a component, such as a DA, in an embodiment, in connection with a received I/O request. The DA may maintain an urgent request queue 710 and a non-urgent request queue 712. The DA may determine if the received I/O request is urgent, for example, in accordance with the value in field 612. If the current time is at, or later than, the value indicated in 612, then at which the request becomes urgent has passed. Accordingly, the request is deemed urgent and placed in queue 720. Otherwise, the request may be deemed non-urgent and placed in the queue 722. The position at which newly added requests are added to each queue 710 and 712 may vary with each embodiment. For example, an embodiment may manage queue 712 by keeping the queue 712 sorted in accordance with increasing values for field 612 (e.g., time at which a request becomes urgent). Periodically, the DA may move elements from non-urgent queue 712 to urgent queue 710 as I/O requests become urgent in accordance with values of field 612 associated with each I/O request. I/O requests may be added to urgent queue 710 by placing new I/O requests at the front or head of the queue. Urgent requests may be serviced on a FIFO (first in first out) basis by selecting a next urgent request from the tail 722 of the urgent queue for processing. Other embodiments may use other techniques in connection with management of queues 710 and 712.

It should be noted that each of the queues 710 and 712 may be implemented using any one of a variety of different data structures such as, for example, doubly linked lists, singly linked list, arrays, and the like.

When a command is received from a host to abort outstanding I/O requests for a particular LV, entries from queues such as 710 and/or 712 may be removed for the outstanding I/O requests. If the threshold conditions described above (e.g., X aborts in Y seconds and the maximum resources for the LV in accordance with the QOS level are being utilized), the QOS level for the LV is adjusted so that additional resources of the data storage system are allocated for use in connection with servicing I/O requests for the LV. In one embodiment, such an adjustment may result in decreasing the TBU value for the LV and the host reissuing new I/O requests for those aborted. The newly received I/O requests will each have an associated time at which the request becomes urgent 612 determined in accordance with the adjusted TBU value for the LV. Thus, the newly received I/O requests become urgent sooner than without the adjustment.

An embodiment may service the urgent I/O requests using any one of a variety of different techniques giving higher processing priority to urgent requests over non-urgent request. For example, an embodiment may process all urgent requests prior to processing any non-urgent request. In another embodiment, a selected number of urgent requests, N, may be processed for each non-urgent request processed. The foregoing are a few examples of the policies that may be utilized in embodiment to give processing priority to urgent requests, for example, by each DA as described herein.

Referring back to FIG. 10, an embodiment may use other techniques and record other information in connection with tracking and determining when an I/O request becomes urgent. For example, an embodiment may omit field 612 and use field 610 when determining when a request becomes urgent. In such an embodiment, an I/O request is considered urgent if the current time−the arrival time>the TBU of the LV to which the I/O request is directed.

An embodiment utilizing the techniques herein to adjust the QOS level may limit the number of times a QOS level may be raised for an LV. This may be specified as another condition that is met prior to adjusting the QOS level to allocate additional resources for use when servicing I/O requests for the LV. An embodiment may specify a maximum number of times, P, that the QOS level may be adjusted for a single LV. P may be specified, for example, as integer value. A defined time period, Q, may also be associated with this maximum number of times, P, so that number of QOS level adjustments for an LV does not exceed P adjustments within the time period, Q. Values for P and Q may be specified and applied individually to each LV or selected LVs. An embodiment may, for example, specify different values of P and/or Q for different LVs depending on the application and data storage uses. For example, an embodiment may specify a single value for P and Q specifying limits applied to each LV. Another embodiment may define a first set of values for P and Q which are applied individually to selected LVs, such as LV1 and LV2. The embodiment may also define a second set of values of P and Q which are applied individually to other selected LVs, such as LV3 and LV4.

An embodiment may limit the number of times that a QOS level for one or more LVs may be adjusted by specifying a maximum value, MAX, representing the maximum number of times QOS level adjustment processing as described herein may be performed for all LVs in the data storage system. In other words, a sum is maintained representing the total number of times the QOS level is adjusted for any of the LVs in the data storage system. A QOS level adjustment to allocate more resources in connection with techniques herein is not performed if there have already been MAX number of adjustments made across all LVs of the data storage system. The foregoing may more formally be represented as:

$$\left(\sum_{i=1}^{n} \text{\#\_of\_times\_QOS\_level\_raised\_for\_LVn}\right) \le \text{MAX} \quad \text{EQUATION 1}$$

for all n LVs in the data storage system. An embodiment may implement the condition expressed by EQUATION 1 with respect to a defined time period so that the QOS level will only be adjusted if the condition of EQUATION 1 is true for a defined window of time relative to the current time (e.g., the QOS level has not been raised MAX times within the last 24 hours).

As in connection with other parameters, values for P, Q, MAX and the defined window of time used with MAX may be configurable in accordance with each embodiment.

What will now be described in connection with FIGS. 12, 13, 14 and 15 are flowcharts summarizing processing steps described above that may be performed in a embodiment.

Figure 12:
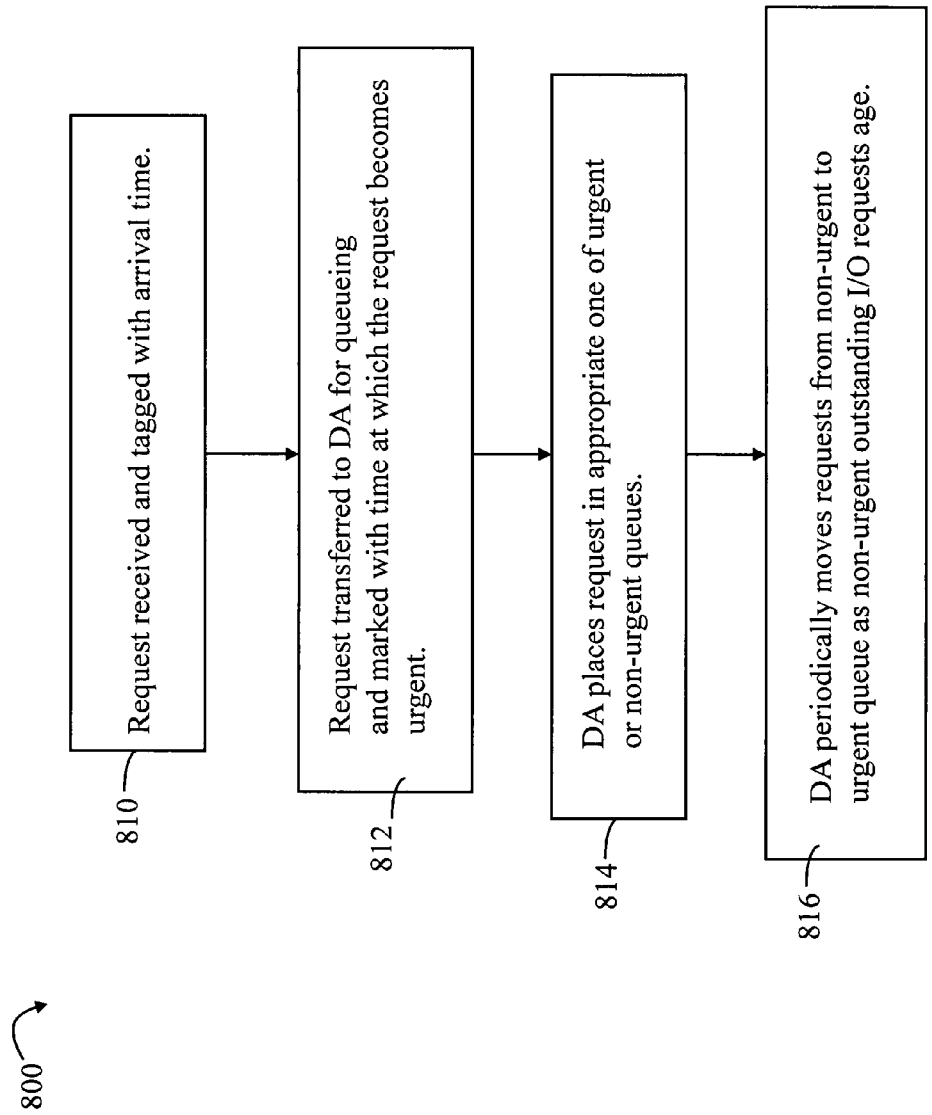

Referring to FIG. 12, shown is a flowchart 800 of processing steps that may be performed in an embodiment in connection with processing received I/O requests. At step 810, the received I/O request is tagged with the arrival time. At step 812, the request is transferred to the DA for queuing in a wait queue and marked with the time at which the request becomes urgent. At step 814, the DA places the request in the appropriate one of the urgent or non-urgent queues for processing.

At step 816, the DA may periodically move requests from the non-urgent queue to the urgent queue as the non-urgent outstanding I/O requests age. As described above, any one of a variety of different techniques may be used to process the urgent I/O requests in a prioritized manner with respect to the non-urgent I/O requests.

Figure 13:
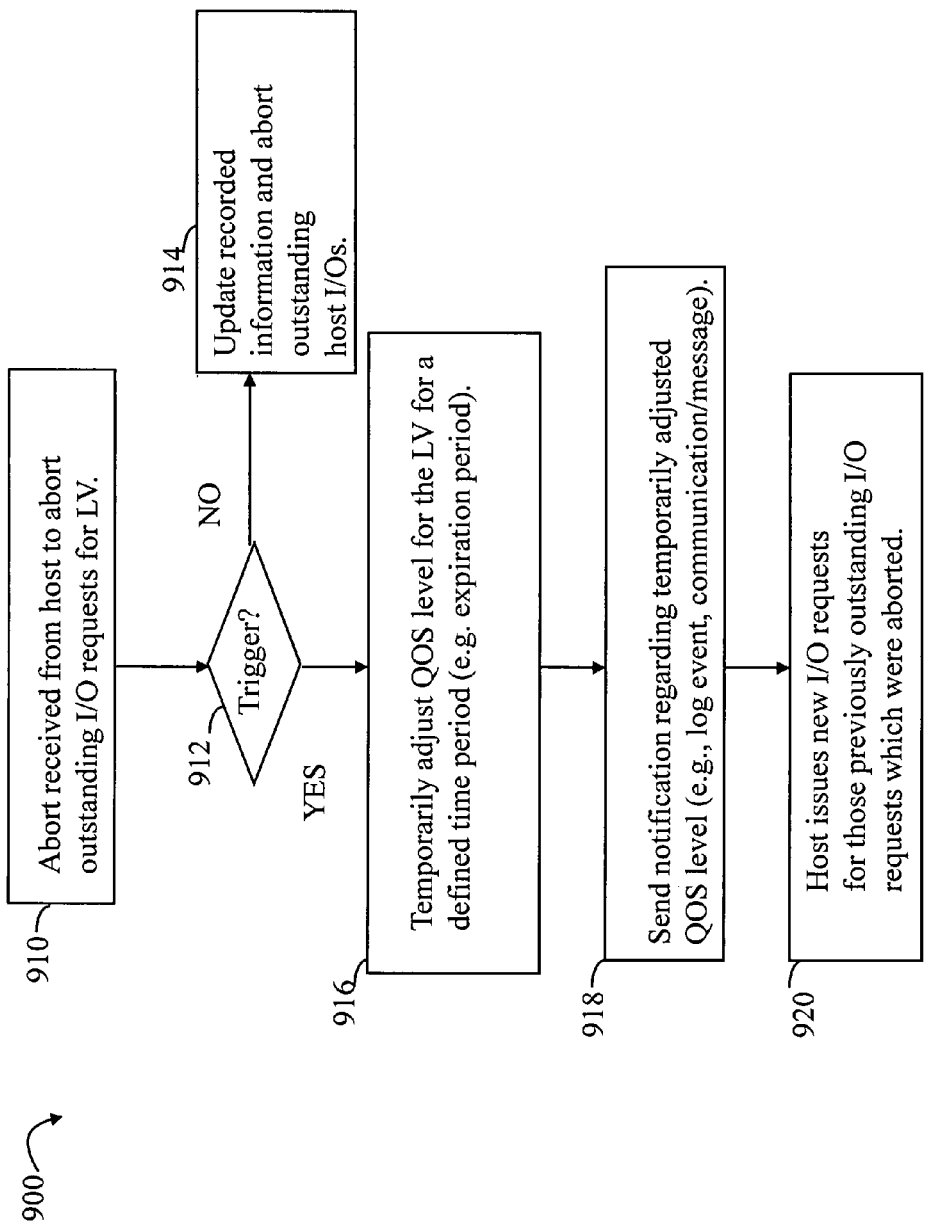

Referring to FIG. 13, shown is a flowchart 900 of processing steps that may be performed in an embodiment in connection with processing commands to abort I/O requests as may be sent from a host to data storage system. At step 910, an abort command is received by the data storage system to abort I/O requests directed to one or more LVs of the data storage system. At step 912, a determination is made as to whether conditions as may be specified in an embodiment are met to trigger processing which adjust the QOS level for the one or more LVs. As described above, a determination may be made regarding whether X aborts have occurred within the time period Y for the one or more LVs which are utilizing the currently allocated resources in accordance with defined QOS limits. An embodiment may also specify additional conditions to be met in addition to that for X and Y. The additional conditions may be in accordance with P, Q, MAX and/or the defined window of time used with MAX as described above to limit the number of times that the QOS level is raised for an LV. If the conditions specified in an embodiment are not met, step 912 evaluates to no and the processing to adjust the QOS level of the one or more LVs is not performed. If step 912 evaluates to no, control proceeds to step 914 where the recorded information for the one or more LVs may be updated and the data storage system proceeds with aborting the outstanding I/Os for the one or more LVs indicated in the abort command form step 910. Step 914 may include, for example, updating the abort information in the table 550 of FIG. 9. If step 912 evaluates to yes, control proceeds to step 916 to temporality adjust the priority and QOS level for the one or more LVs indicated in the abort command from step 910. The foregoing adjustment allocates additional resources for use when servicing I/O requests directed to the one or more LVs. The QOS level may be adjusted for each of the one or more LVs for a defined time period after which the previously defined QOS levels are re-established. At step 918, a notification may be sent regarding the temporarily adjusted QOS level. At step 920, the host issues new I/O requests for those previously aborted outstanding I/O requests.

Referring to FIG. 14, shown is a flowchart 1000 including processing steps that may be performed in an embodiment by a DA in connection with queuing a newly received I/O request. At step 1010, a determination is made as to whether the time to become urgent associated with the I/O request has passed. If so, control proceeds to step 1014 to place the I/O request on the urgent queue. Otherwise, control proceeds to step 1012 the place the requests in a non-urgent queue.

Referring to FIG. 15, shown is a flowchart 1050 including processing steps that may be periodically performed in an embodiment by a DA to move I/O requests from non-urgent queue to the urgent queue as I/O requests age. At step 1052, processing starts at the head of the non-urgent queue. At step 1056, a determination is made as to whether all I/O requests on the non-urgent queue have been examined. If so, processing stops. Otherwise, control proceeds to step 1058 to determine if, for the current I/O request examined on the non-urgent queue, has the time to become urgent for the current I/O request passed. If so, control proceeds to step 1060 to move the request to the urgent queue and then control proceeds to step 1054 to process the next entry of the non-urgent queue. If step 1058 evaluates to no, control proceeds directly to step 1054. From step 1054, control proceeds to step 1056.

The techniques herein may be characterized as a safety mechanism to provide additional resources to a failing host by adjusting priority and QOS levels for a time period when specified conditions are met. The conditions may be characterized as criteria which, when met, trigger processing to adjust the QOS level of one or more LVs. Additionally, a notification is sent if the QOS level adjustment processing is performed with respect to one or more LVs. The notification provides a data storage administrator or other individual an opportunity to take a corrective action. The corrective action may include, for example, adjusting an application's rate of I/Os, reconfiguring the data storage system by correcting QOS level assignments for LVs used by the application, and the like. The data storage system may monitor the behavior of I/O timeouts or failures experienced by a host as reported in connection with the received abort commands. The information may be tracked on a per LV basis in connection with the I/O failures associated with data storage used by an application on a host. Thus, the I/O timeouts or failures are tracked based on the data storage used by the application executing on a host.

The techniques herein may be used as a safety mechanism to avoid host and/or application failure for improperly assigned QOS levels allowing the storage administrator to make such corrections in response to notification of temporary QOS level adjustments. Additionally, I/O requests may occur occasionally in bursts. The techniques herein may be used to identify when a host and/or application are in a distressed state, temporarily allocate additional resources alleviating a temporary backlog of I/O requests distress signal, and then return resources usage rates to the previous level prior to the adjustment in accordance with the defined QOS levels.

The techniques herein may be performed by executing code stored on a computer readable medium. In one embodiment, code executed in connection with the techniques herein may be stored on a computer-readable medium on the data storage system. Different types of computer-readable medium are well known in the art and may include, for example, different types of non-volatile storage, such as disks, as well as volatile storage devices.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for servicing data requests in a data storage system comprising:
   receiving, from a host, one or more data requests from an application executing on the host, said data storage system allocating a first amount of resources for use in servicing said one or more data requests from the application;
   monitoring behavior of the host for occurrences of I/O (input/output operation) failure;
   determining, in accordance with criteria and the occurrences of I/O failure, whether at least one of the host or the application is in a state of pending failure, wherein said criteria includes conditions which, when met, indicate said state of pending failure and trigger processing to provide additional resources, wherein file state of pending failure includes a specified number of I/O failures occurring within a threshold amount of time, said specified number of I/O failures within said threshold amount of time being included in said criteria and selected in accordance with a tolerance level above which said at least one of the host or the application becomes unavailable for use;
   if said determining determines that at least one of the host or the application is in a state of pending failure, allocating for a time period a second amount of resources larger than the first amount of resources for use in servicing said one or more data requests from the application, wherein said time period is a defined time period specifying an expiration time after which the one or more data requests from the application are serviced based on the first amount of resources; and
   after the time period has expired, servicing said one or more data requests from the application in accordance with the first amount of resources.

2. The method of claim 1, further comprising:
   sending a notification regarding said allocating the second amount of resources.

3. The method of claim 2, wherein said notification includes writing to a log file.

4. The method of claim 1, wherein said first amount of resources is in accordance with a first quality of service level associated with applications having a first priority level.

5. The method of claim 4, wherein said second amount of resources is in accordance with a second quality of service level associated with applications having a higher priority than said first priority level.

6. The method of claim 1, further comprising:
   receiving, from said host by the data storage system, an abort command to abort a first set of one or more outstanding data requests for the application, said abort command indicating a host I/O failure, wherein said first set of outstanding data requests is received when the first amount of resources is allocated for use in servicing data requests from the application;
   aborting, by the data storage system, the first set of outstanding data requests;
   receiving, from the host by the data storage system, a second set of one or more data requests when the second amount of resources is allocated for use in servicing data requests from the application; and
   servicing said second set of one or more data requests in accordance with said second amount of resources.

7. The method of claim 1, wherein said one or more data requests from the application are directed to a device of the data storage system, the first amount of resources being a quality of service level associated with the device.

8. The method of claim 7, wherein the second amount of resources is an adjusted quality of service level associated with the device for the time period and, after the time period, the first amount of resources is reestablished as the quality of service for the device.

9. The method of claim 7, wherein the device is a logical device.

10. The method of claim 1, wherein the criteria includes limiting a number of times said allocating step is performed.

11. The method of claim 1, wherein the criteria includes limiting a number of times said allocating step is performed within a defined amount of time in connection with data requests from the application directed to a particular device of the data storage system.

12. The method of claim 1, wherein the criteria includes limiting a number of times said allocating step is performed within a defined amount of time in connection with data requests from the application and one or more other applications directed to devices of the data storage system.

13. The method of claim 1, further comprising:
collecting data regarding the occurrences of I/O failure for each device of the data storage system, wherein said determining uses said data in determining whether a threshold number of I/O failures are associated with data requests directed to at least one of the devices of the data storage system.

14. A method for servicing data requests in a data storage system comprising:
receiving configuration information for the data storage system, the configuration information including a quality of service level for each device of the data storage system used by one or more applications, said quality of service level for said each device indicating a maximum amount of resources of said data storage system used to service data requests directed to said each device;
receiving one or more data requests from one or more applications executing on one or more hosts;
monitoring behavior of the one or more hosts for abort commands to abort outstanding data requests not serviced within a defined amount of time;
determining when one of the hosts has sent one or more abort commands in accordance with threshold criteria;
if said determining determines that a first of said hosts has sent one or more abort commands in accordance with said threshold criteria, each of said one or more abort commands requesting to abort: outstanding data requests directed to a first of the devices of the data storage system, allocating a second amount of resources for use in servicing data requests directed to the first device for a time period, said second amount of resources being larger than a first amount of resources in accordance with a quality of service level for the first device, wherein said time period is a defined time period specifying an expiration time after which data requests directed to the first device are serviced based on the first amount of resources wherein said threshold criteria includes receiving a threshold number of abort commands within a defined amount of time said abort commands requesting to abort data requests directed to one or more devices of the data storage system, said threshold number within said defined amount of time being selected in accordance with a tolerance level above which said first host becomes unavailable for use; and
after the time period has expired, servicing data requests directed to the first device in accordance with the first amount of resources.

15. The method of claim 14, further comprising:
sending a notification regarding said allocating the second amount of resources.

16. The method of claim 14, further comprising:
receiving, from one of the hosts by the data storage system, an abort command to abort a first set of one or more outstanding data requests directed to one of the devices, wherein said first set of outstanding data requests is received when a first amount of resources is allocated for use in servicing data requests directed to the one device;
aborting, by the data storage system, the first set of outstanding data requests;
receiving, from the one host by the data storage system, a second set of one or more data requests when a second amount of resources larger than the first amount is allocated by said allocating step for use in servicing data requests directed to the one device; and
servicing said second set of one or more data requests in accordance with said second amount of resources.

17. The method of claim 14, wherein said threshold criteria includes a maximum number of times said allocating step is performed within an amount of time in connection with data requests directed to one or more devices of the data storage system.

18. A data storage system comprising a non-transitory computer readable medium with executable code stored thereon for servicing data requests, the non-transitory computer readable medium comprising executable code for:
receiving, from a host, one or more data requests from an application executing on the host, said data storage system allocating a first amount of resources for use in servicing said one or more data requests from the application;
monitoring behavior of the host for occurrences of I/O (input/output operation) failure; determining, in accordance with criteria and the occurrences of I/O failure, whether at least one of the host or the application is in a state of pending failure, wherein said criteria includes conditions which, when met, indicate said state of pending failure and trigger processing to provide additional resources, wherein the state of pending failure includes a specified number of I/O failures occurring within a threshold amount of time, said specified number of I/O failures within said threshold amount of time being included in said criteria and selected in accordance with a tolerance level above which said at least one of the host or the application becomes unavailable for use;
if said determining determines that at least one of the host or the application is in a state of pending failure, allocating for a time period a second amount of resources larger than the first amount of resources for use in servicing said one or more data requests from the application, wherein said time period is a defined time period specifying an expiration time after which the one or more data requests from the application are serviced based on the first amount of resources; and
after the time period has expired, servicing said one or more data requests from the application in accordance with the first amount of resources.

* * * * *